UNITED STATES PATENT OFFICE.

WALTER KÖNIG, OF DRESDEN, GERMANY, ASSIGNOR TO FARBENFABRIKEN VORM. FRIEDR. BAYER & CO., OF ELBERFELD, GERMANY, A CORPORATION OF GERMANY.

RED BASIC DYE.

947,918.  Specification of Letters Patent.  Patented Feb. 1, 1910.

No Drawing.  Application filed February 16, 1909. Serial No. 478,283.

*To all whom it may concern:*

Be it known that I, WALTER KÖNIG, doctor of technical arts, chemist, citizen of the German Empire, residing at Dresden, Germany, have invented new and useful Improvements in Basic Dyestuffs, of which the following is a specification.

In the application for Letters Patent Ser. No. 465,102 it is stated that dihydroindols, especially dihydroindol and its substitution products can serve as initial materials for the production of red to violet basic coloring matters remarkable for their good fastness to washing and to light and their extraordinary clearness. I have now found that dyestuffs of the same valuable properties can be obtained by condensing the dihydroindols especially dihydroindol and its substitution products either with aldehydes of the following general formula:

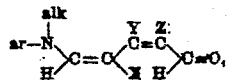

(ar meaning aryl; alk=alkyl; X, Y, Z=hydrogen or other substituents) or the respective oxims or hydrazones, or by condensing aldehydes or oxims or hydrazones of the above given formula wherein

means the residue of dihydroindols or their substitution products with secondary aromatic amins.

The new products exist in two isomeric forms of different shades, e. g. according to the following formulae:

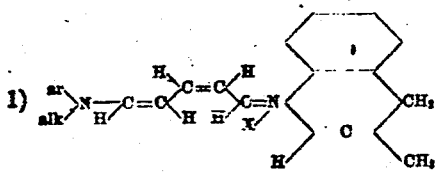

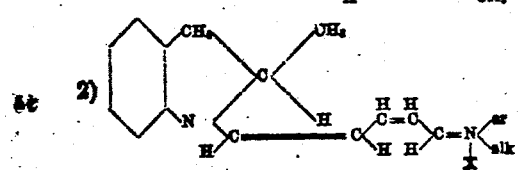

(ar meaning aryl; alk=alkyl and X an acid radical).

(a) *Compounds of the formula 1.*—In the *Annalen der Chemie*, Vol. 338, 133, it is shown that the pyridin dyestuffs obtainable from secondary aromatic amins with an open side-chain (*e. g.* monomethylanilin) split off one molecule of amin by treatment with alkalies, aldehydes of the formula:

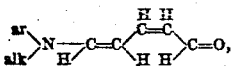

being formed. These aldehydes can be easily condensed with one molecule of dihydroindols, especially dihydroindol and its substitution products in the presence of acids, red dyestuffs being obtained. The same products are obtained on using the oxims or hydrazones, semicarbazones, semioxamazones, benzhydrazids and aminoguanidins of these aldehydes.

(b) *Compounds of the formula 2.*—These compounds can be obtained by condensing with secondary aromatic amins the aldehydes of the formula:

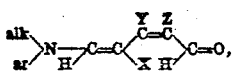

(X, Y, Z=hydrogen or any substituents,

meaning the residue of a dihydroindol.) These aldehydes can be obtained by treating the dyestuffs of the earlier application Ser. No. 465,102 with alkalies. The dyestuffs of this kind have a yellower shade than those described under (a).

The new dyes are reddish products soluble in hot water with a reddish color, and dyeing tanned cotton from yellow to red shades.

In order to illustrate the new process more fully the following examples are given, the parts being by weight:

Example 1: In a flask provided with a reflux condenser 1.87 parts of the aldehyde (described in *Annalen der Chemie*, Vol. 338, 127) of the formula:

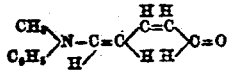

(M. P. 79°) are heated on the water-bath for about 4 hours with 5 parts of alcohol, 2 parts of acetic acid (30 per cent.) and 1.33 parts of dihydroalphamethylindol until the red color of the mixture does not change any more. The alcohol is then distilled off and the residue is introduced into water containing hydrochloric acid and common salt. The new dye separates in the shape of microscopic red needles which are filtered off and dried. It is easily soluble in alcohol and in hot water with a red color and dyes tanned cotton a very clear scarlet shade fast to washing and to light. The same dyestuff can be obtained by allowing an alcoholic solution of a mixture of 1 molecule of the aldehyde and 1 molecule of the hydrochlorid of dihydromemethylindol to stand for some time and then treating it as described in the example. On using the oxim of the aldehyde (M. P. 117°) or the phenylhydrazone (M. P. 141°) the same dyestuff is obtained as described in Example 1. Substitution products of the aldehyde generally furnish bluer dyes. Thus one can use e. g. the aldehyde:

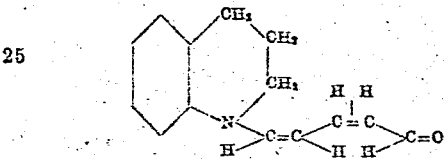

which can be obtained from the tetrahydroquinolin pyridin dyestuff, (yellow prisms of a blue luster melting at 113° C.), or its oxim or hydrazone etc.

Example 2: 2.13 parts of the aldehyde (M. P. 126, 5°):

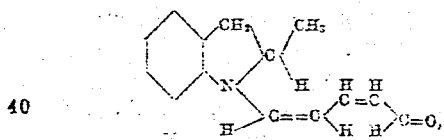

or 2.28 parts of its oxim (M. P. 181°) which aldehyde can be obtained by treatment with alkalies of the pyridin dyestuff obtainable from dihydro-alpha-methylindol (see appl. Ser. No. 465102) are heated on the waterbath for several hours with 5 parts of alcohol, 1 part of acetic acid 60 per cent.) and 1.33 parts of tetrahydroquinolin. The mixture is then treated as described under Example 1. The dye crystallizes in the shape of microscopic needles of a green luster dyeing tanned cotton clear scarlet-red shades.

Instead of tetrahydroquinolin any other secondary aromatic amins e. g. monomethylanilin, monoethylanilin, etc. may be used. Scarlet-red dyes are obtained from these amins.

Having now described my invention and in what manner the same is to be performed, what I claim as new and desire to secure by Letters Patent is:—

1. The herein-described new basic dyestuffs being derived from dihydroindols, which dyes are reddish crystalline products soluble in hot water with a reddish color, and dyeing tanned cotton from yellow to red shades, substantially as described.

2. The herein-described new basic dyestuff obtainable from the aldehyde

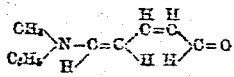

and dihydro-alpha-methyl-indol, which crystallizes in the shape of red needles, which are soluble in hot water with a red color and easily soluble in alcohol with a red color, and which dyes tanned cotton a clear scarlet shade, substantially as described.

In testimony whereof I have hereunto set my hand in the presence of two subscribing witnesses.

WALTER KÖNIG.

Witnesses:
HARRY A. McBRIDE,
PAUL ARRAS.